E. C. POOL.
PENDULUM SCALE.
APPLICATION FILED MAR. 29, 1918.
1,326,963. Patented Jan. 6, 1920.
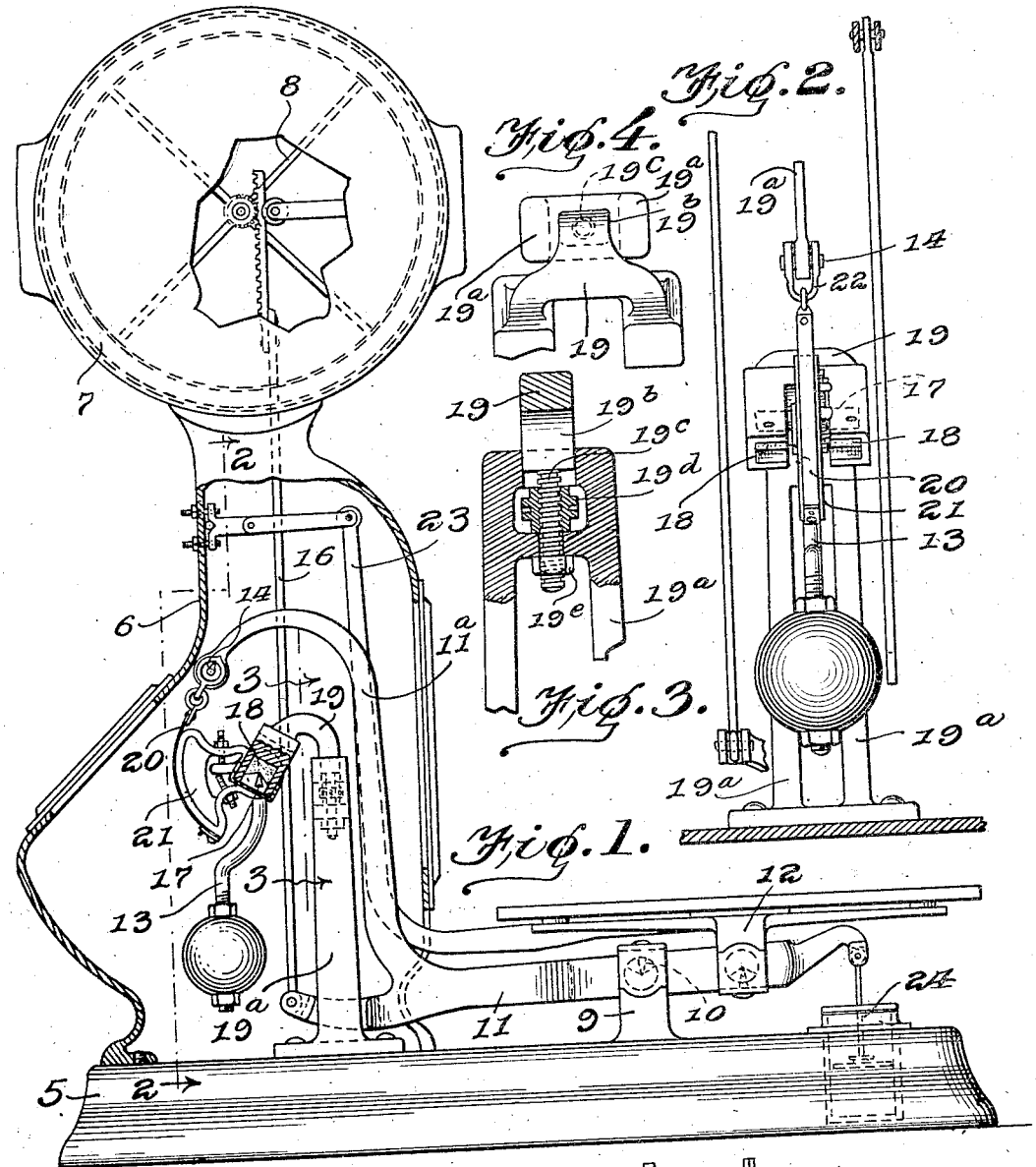
Inventor
Elmer C Pool

UNITED STATES PATENT OFFICE.

ELMER C. POOL, OF NEW CASTLE, PENNSYLVANIA, ASSIGNOR TO TOLEDO SCALE COMPANY, OF TOLEDO, OHIO, A CORPORATION OF NEW JERSEY.

PENDULUM-SCALE.

1,326,963.  Specification of Letters Patent.  Patented Jan. 6, 1920.

Application filed March 29, 1918. Serial No. 225,478.

*To all whom it may concern:*

Be it known that I, ELMER C. POOL, a citizen of the United States, residing at New Castle, in the county of Lawrence and State of Pennsylvania, have invented certain new and useful Improvements in Pendulum-Scales, of which the following is a specification.

This invention relates to improvements in automatic weighing scales of the pendulum type, and particularly to counter scales—*i. e.*, scales of relatively small capacity adapted to rest on counters in stores, shops, and like places.

Among the principal objects of this invention are the provision of a pendulum scale having a low platform resting upon a main lever directly connected with the pendulum, the use in such a low platform scale of a pendulum that is normally pendent, and the adaptation in a counter scale of a pendulum having its fulcrum bearing inverted.

A further object is the provision of a practical pendulum scale having a main lever in which the pivots supporting the platform and the pendulum are, contrary to the usual practice, out of alinement with the fulcrum pivots. In the present invention the pendulum supporting pivots are placed in a horizontal plane considerably above that of the platform-supporting and fulcrum pivots in the lever.

A further object is to provide a scale mechanism that is simple, inexpensive and efficient, and that can be quickly assembled into a compact counter scale.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a side elevation, with parts broken away, of one form of scale embodying my improvements therein;

Fig. 2 is a detail elevation of the pendulum and associated parts;

Fig. 3 is a detail sectional view taken substantially on the line 3—3 of Fig. 1;

Fig. 4 is a detail plan view thereof; and

Fig. 5 is a detail plan view of the main lever.

In the drawings I have shown one well-known type of counter scales by way of example, wherein a cylinder or drum bearing a peripheral chart on which is inscribed suitable weight and price computations is rotatably mounted in a housing above the pendulum counterbalancing mechanism of the scale and is suitably connected with the same main lever which operates the pendulum. This type of scale is well known through long continued sale on the market and is shown in several prior patents, and serves to show the adaptability of my invention to the usual types of counter scales, it being understood, however, that there is no intention to limit my invention to any particular type of scale.

In the illustrated embodiment the numeral 5 designates the base of the scale upon which is supported a housing 6 adapted to inclose the pendulum weighing mechanism of the scale and which in turn supports a casing 7 inclosing the cylinder 8 bearing the weight and value indications. The base 5 carries low supports 9 for the fulcrum pivots 10 of the main lever or scale beam 11, upon which rests the commodity-receiving platform 12 whereby the platform is spaced a very short distance above the counter upon which the scale is supported. As herein shown, the scale beam 11 is formed as a lever of the first order, the platform being supported on the opposite side of the fulcrum bearing from that carrying the connections to the load-offsetting pendulum 13. Inwardly of the platform the scale beam 11 enters the housing 6 through a suitable aperture therein and bends sharply upward to form the long vertical arm 11$^a$, the upper end of which is bent rearwardly and carries the pivots 14 through which connection is made with the pendulum 13. The effect of this is to make the main lever an angled or bell-crank lever, contrary to the usual practice of scale manufacturers. Through an arm 15 the main lever 11 is connected with the rack rod 16 through which rotation is imparted to the cylinder 8 in accordance with the movements of the scale beam when an article is weighed thereon.

The pendulum 13 is provided with upwardly pointed fulcrum pivots 17 engaging in inverted bearings 18 carried in an adjustable fulcrum stand 19, direct connection being made to the main lever 11 through the flexible ribbon 20 secured at one end to the arcuate cam 21 adjustably carried by the pendulum and at its other end to a clevis 22 engaging the pivots 14 of the main lever. The adjustable fulcrum stand for the pendulum is herein shown as provided with standards 19ª grooved adjacent its upper extremity for the reception of the bearing bracket 19ᵇ having a bolt 19ᶜ threaded into an adjusting nut 19ᵈ (see Fig. 3), a locking nut 19ᵉ being provided to hold the bearing bracket in any desired position.

A suitable check link, as 23, may be provided for maintaining the platform 12 in level position, and suitable damping means, as the dash pot 24, may be connected with the weighing mechanism to check undue oscillation during the weighing operation.

In the operation of the scale, a commodity placed on the platform 12 will depress the arm of the main lever on which the platform is supported, and elevate the opposite arm to which the pendulum is connected, the pivot 14 in such main lever swinging on an arc with the fulcrum pivots 10 of the main lever as its center. The upward swinging movement of this portion of the scale lever exerts a pull upon the flexible ribbon 20 and through it elevates the pendulum 13 to a position offsetting the weight of the commodity upon the scale platform. Simultaneously the upward movement of the arm 15 elevates the rack rod 16 to indicate through the cylinder 8 the weight of such commodity.

While it will be apparent that the illustrated embodiment of my invention herein disclosed is well calculated to adequately fulfil the objects primarily stated, it is to be understood that the invention is susceptible to variation, modification and change without departing from the spirit and scope of the invention as set forth in the subjoined claims.

Having described my invention, I claim:

1. In a weighing scale, a pendulum, a main lever, a platform resting upon the lever, connections from the lever to actuate the pendulum, the lever connection with the pendulum being in a plane above that of the lever connections to the platform and the fulcrum pivots, indicating mechanism including a pinion, and a rack rod for driving the pinion connected with the lever in the same horizontal plane as the lever connections to the platform and fulcrum.

2. In a weighing scale, a base, a main lever fulcrumed thereon, a pendulum, connections from the pendulum to pivots in the lever, a platform resting upon pivots in the lever, the pivots connected with the pendulum being in a plane some distance above the plane of the fulcrum and platform-supporting pivots of the lever, indicating mechanism including a pinion, and a rack rod for driving the pinion connected with the lever in the same horizontal plane as the lever connections to the platform and fulcrum.

3. In a weighing scale, a base, a main lever fulcrumed thereon, having a portion extending upwardly to a point well above the fulcrum pivots, a platform supported upon pivots carried by the lever in horizontal alinement with the fulcrum pivots thereof, a pendulum fulcrumed upon the base and connected with the lever in a horizontal plane some distance above the plane of the fulcrum and platform-supporting pivots, indicating mechanism including a pinion, and a rack rod for driving the pinion connected with the lever in the same horizontal plane as the lever connections to the platform and fulcrum.

4. In a weighing scale and in combination with the indicating mechanism thereof, a base, a main lever fulcrumed thereon, having a portion extending upwardly to a point well above the fulcrum pivots, a platform supported upon pivots carried by the lever in horizontal alinement with the fulcrum pivots thereof, a pendulum having upwardly-extending fulcrum pivots, inverted bearings for said pendulum pivots carried by the base, and connections for swinging the pendulum from the main lever arranged above the horizontal plane of the fulcrum and knife-edge pivots of the lever.

5. In a weighing scale and in combination with the indicating mechanism thereof, a base, a main lever fulcrumed thereon, having a portion extending upwardly to a point well above the fulcrum pivots, a platform supported upon pivots carried by the lever in horizontal alinement with the fulcrum pivots thereof, a pendulum having upwardly-extending fulcrum pivots, inverted bearings for said pendulum pivots carried by the base, and means for vertically adjusting said bearings.

ELMER C. POOL.

Witnesses:
MILDRED ROBERTS,
MONT L. AILEY.